United States Patent Office 3,347,861
Patented Oct. 17, 1967

3,347,861
TETRACYCLINE HYDROCHLORIDE-PIPERAZINE COMPLEX
Samuel S. M. Wang, Indianapolis, Ind., assignor to The Dow Chemical Company, Midland, Mich., a corporation of Delaware
No drawing. Filed Feb. 7, 1966, Ser. No. 525,365
1 Claim. (Cl. 260—268)

This invention relates to a new anti-bacterial complex and particularly to a complex of tetracycline hydrochloride and piperazine corresponding to the formula

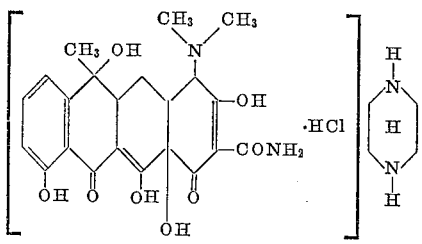

The new anti-bacterial complex is readily soluble in water and when dissolved in water gives the solution a pH of about 5. The new complex salt has been found to control and kill various microorganisms such as *E. coli* and *Streptococcus pyogenes*.

In preparing the new tetracycline hydrochloride-piperazine complex, tetracycline hydrochloride and piperazine are contacted in an acetone-water mixture. The proportions of the reactants to be combined is not critical, some of the desired product being formed when contacting the reactants in any proportions. However the complex contains the tetracycline hydrochloride and piperazine in equimolar ratio and the use of the reactants in such proportions to produce the desired product is preferred. The complex is formed rapidly and in good yields when the reactants are contacted at temperatures of from 25° to 45° C.

In carrying out the preparation of the desired complex the tetracycline hydrochloride and piperazine are contacted in aqueous acetone. The proportion of water to acetone is not critical, however, there must be enough water present to dissolve the tetracycline hydrochloride. The reactants are combined in proportions such that the pH of the final reaction mixture is between 7 and 8. Following the contacting of the reactants the reaction mixture is made acidic (pH 4 to 5) by the addition of a small amount of a mineral acid preferably hydrochloric acid. Upon adjustment of the pH to a point within the desired range the reaction mixture is diluted with diethyl ether until the tetracycline hydrochloride-piperazine complex precipitates in the diluted reaction mixture. The precipitated tetracycline hydrochloride-piperazine complex is then collected by such conventional procedures as filtration, decantation, and centrifugation.

One gram of tetracycline hydrochloride was dispersed in 10 milliliters of acetone. Water was added to the tetracycline hydrochloride acetone dispersion slowly, portionwise, until all of the tetracycline hydrochloride dissolved and thereafter a solution of piperazine in acetone was added thereto with stirring until the pH of the reaction mixture reached about 7.5. Thereafter concentrated hydrochloric acid (about 1 drop) was added to the reaction mixture to adjust the pH to within the range of 4 to 5. Anhydrous ether was then added to the acidified reaction mixture until there was a substantial cessation in the precipitation of the desired tetracycline hydrochloride-piperazine complex. The precipitated product was then collected by filtration. The tetracycline hydrochloride-piperazine complex was then recrystallized by dissolving it in a minimum amount of warm absolute ethanol and thereafter precipitated by the addition of anhydrous ether to the alcohol solution. The recrystallized product was found to melt at 177°–178° C.

The compound of the present invention or compositions containing the same can be applied to bacterial pests or their habitats in microbiocidal amounts to obtain excellent control and kills of many organisms. In further operations, the compound of the present invention can be administered to animals intragastrically or orally to control and combat bacterial infection. The compound conveniently can be employed in liquid or dust compositions. In such usage the compound can be combined with one or more of a plurality of adjuvants or helpers including water, isotonic saline, 10 percent aqueous gum acacia, organic solvents such as edible oils or other nontoxic, liquid carriers, surface-active dispersing agents and finely divided solids such as chalk, talc or bentonite.

The exact concentration of the novel compound to be employed in the treating compositions is not critical and may vary considerably provided at least a microbiocidal amount of the active agent is supplied to the microorganisms and/or its habitat. The concentration of toxicant in liquid compositions is generally from about 5 parts per million by weight to 50 percent by weight. Concentrations up to 95 percent by weight are oftentimes conveniently prepared. In dusts, the concentration of the toxicant can be from about 1 to 10 percent by weight.

In representative operations aqueous compositions containing the tetracycline hydrochloride-piperazine complex gave complete kills of *Escherichia coli* when employed in amounts equivalent to 6.2 milligram-percent. In other operations, twenty mice were inoculated intraperitoneally with an infective dose of *Streptococcus pyogenes* (ATCC 10,526). Thereafter, a 10 percent gum acacia solution containing the tetracycline hydrochloride-piperazine complex in an amount equivalent to 500 milligrams per kilogram of body weight was administered intragastrically once daily for 3 consecutive days to 10 of the mice. Such treatment prevented the death due to streptococcal infection of all of the mice so treated. The remaining inoculated mice were employed as controls and were not treated with the test compound. All of the control mice died as the result of streptococcal infection within 24 to 36 hours after being inoculated.

I claim:
The tetracycline hydrochloride-piperazine complex corresponding to the formula

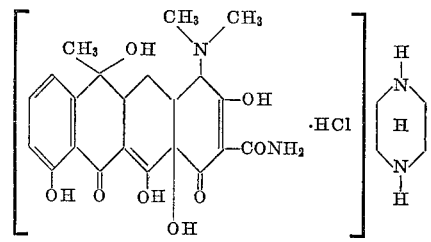

References Cited
UNITED STATES PATENTS
3,272,817  9/1966  Gorchon et al. _____ 260—268

HENRY R. JILES, *Primary Examiner.*